W. J. MILLER.
APPARATUS FOR MANUFACTURING ARTICLES OF GLASS.
APPLICATION FILED JUNE 22, 1918.
1,329,624.
Patented Feb. 3, 1920.
4 SHEETS—SHEET 4.
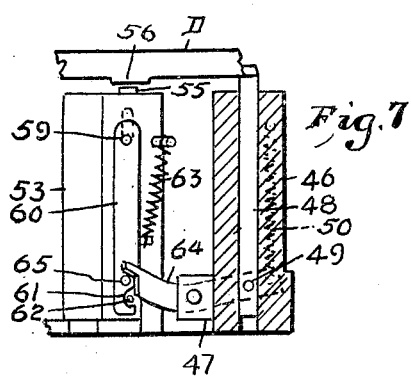
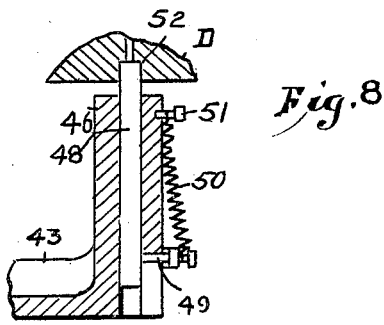
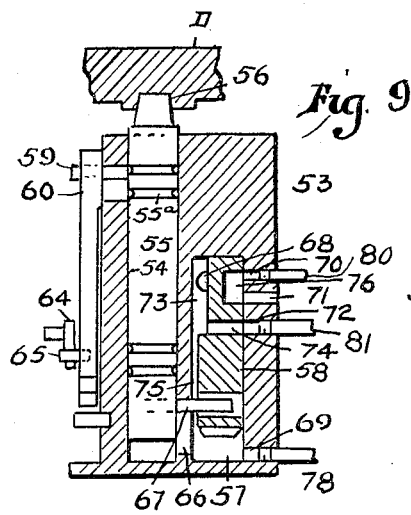
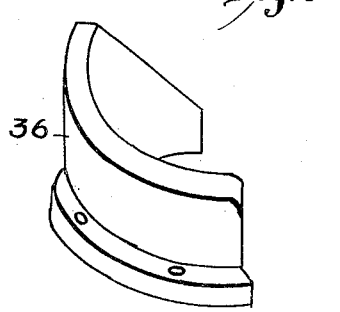
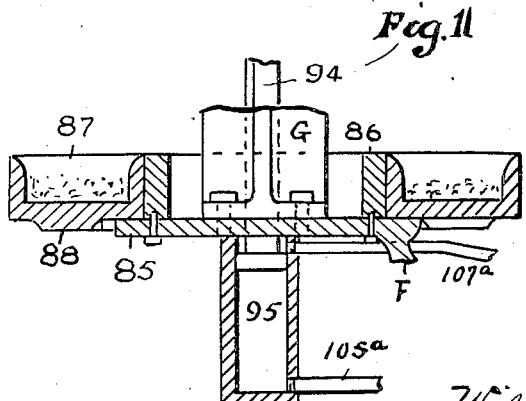
INVENTOR.
William J. Miller,
by Edward A. Lawrence
his Attorney.

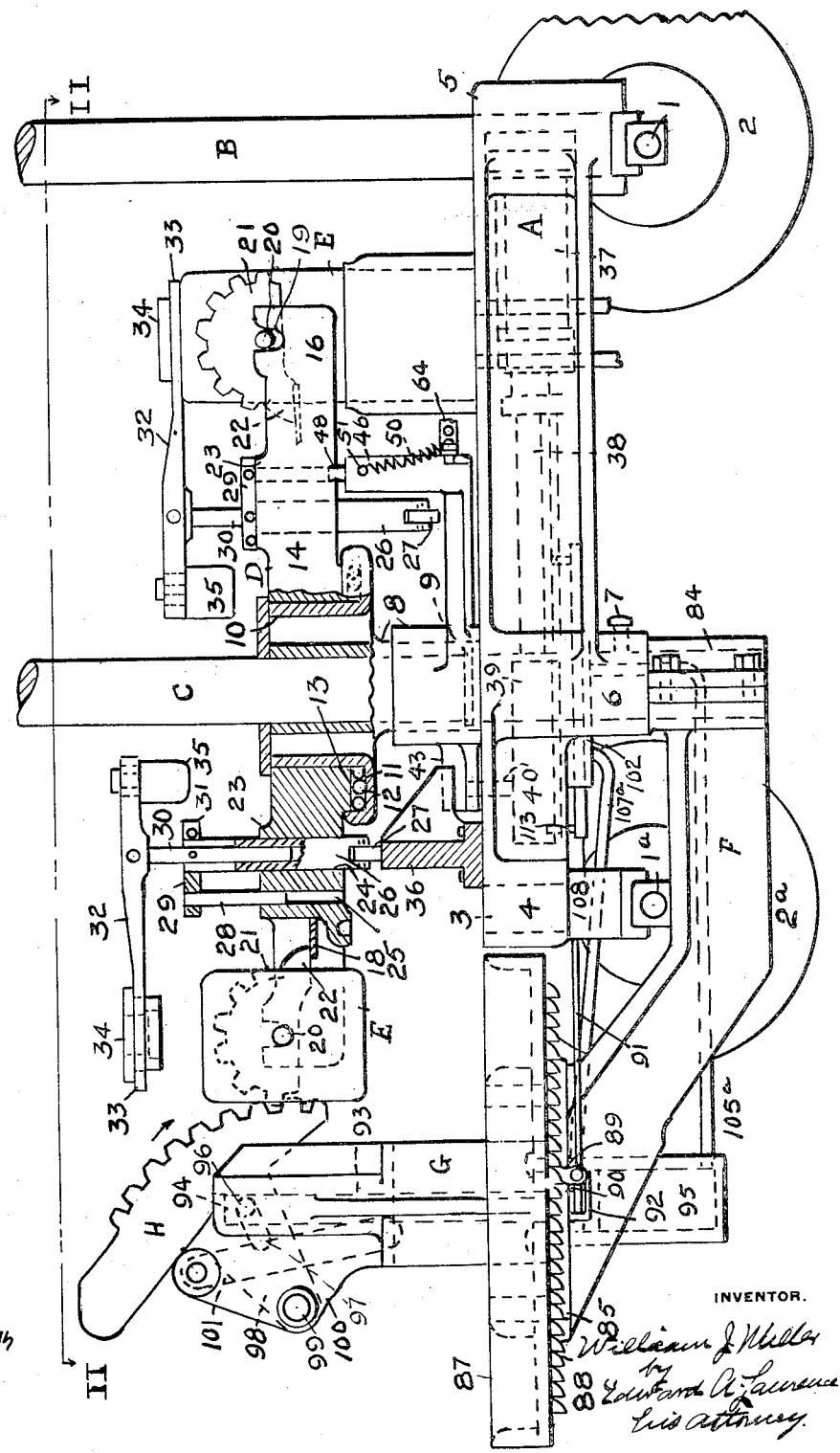

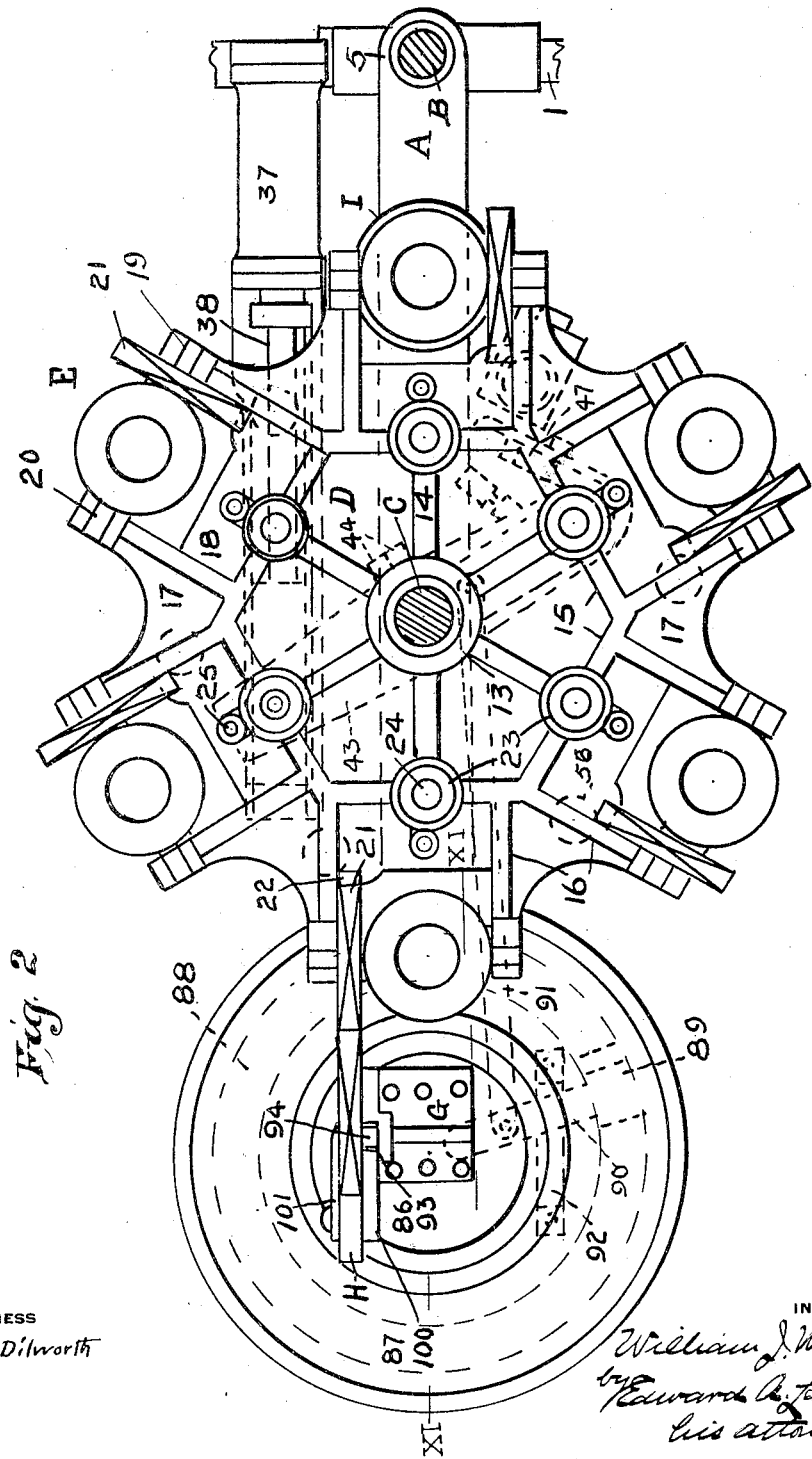

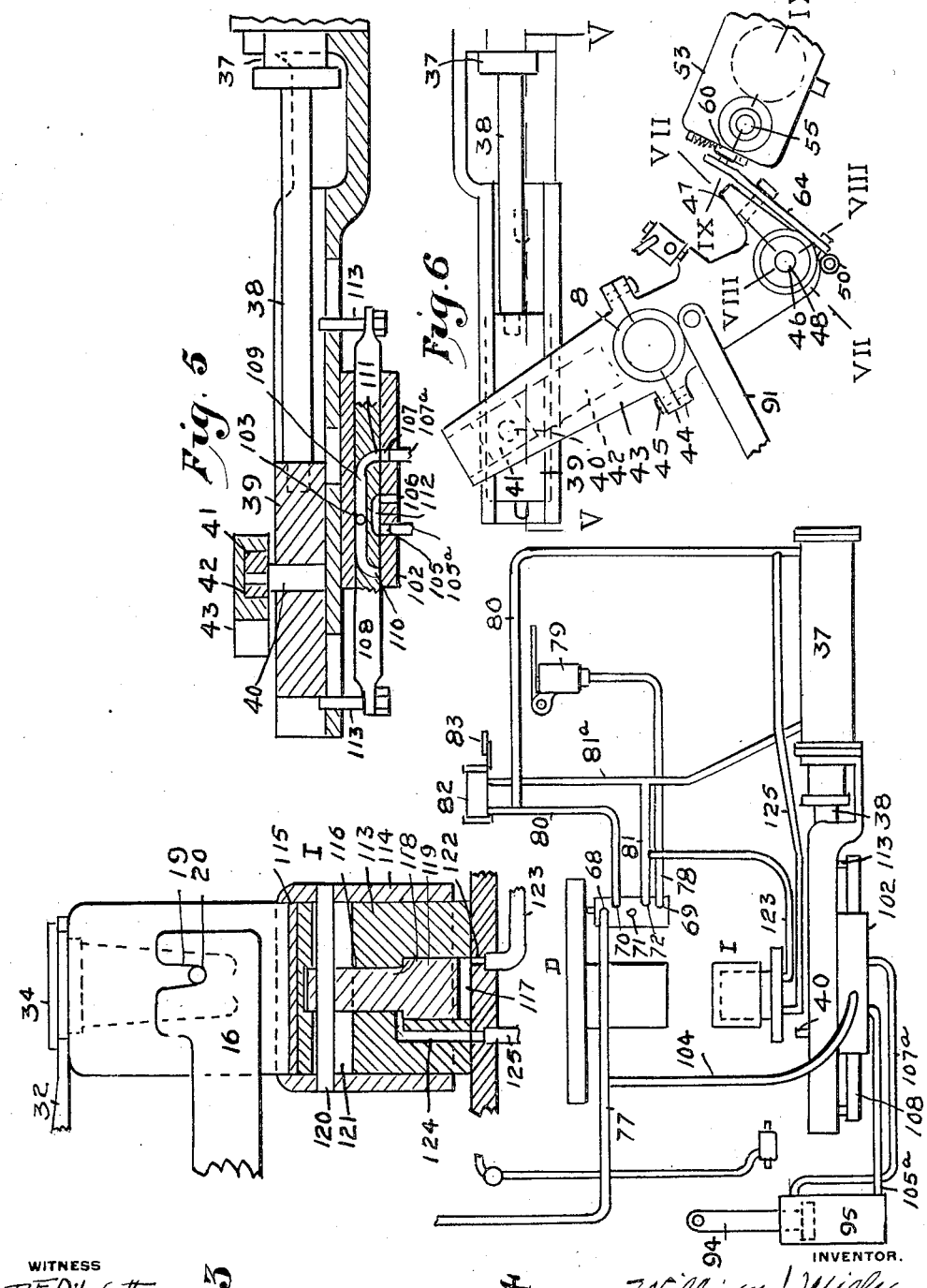

UNITED STATES PATENT OFFICE.

WILLIAM J. MILLER, OF SWISSVALE BOROUGH, PENNSYLVANIA.

APPARATUS FOR MANUFACTURING ARTICLES OF GLASS.

1,329,624.   Specification of Letters Patent.   Patented Feb. 3, 1920.

Original application filed August 11, 1917, Serial No. 185,647. Divided and this application filed June 22, 1918. Serial No. 241,432.

*To all whom it may concern:*

Be it known that I, WILLIAM J. MILLER, a citizen of the United States, and residing in the borough of Swissvale, in the county of Allegheny, and State of Pennsylvania, have invented or discovered new and useful Improvements in Apparatus for Manufacturing Articles of Glass, of which the following is a specification.

This patent application is a division of my previous patent application, Serial Number 185,647, filed August 11, 1917.

My invention consists in new and useful improvements in glass forming machines.

More particularly my present invention provides new and improved means for intermittently rotating or moving a mold support or table and for locking the same stationary between movements; means for discharging the finished glass articles from the mold or molds, and means for supporting the mold or molds during the pressing or forming operation so as to relieve the mold support and its associated mechanism from the strains incident to said operation.

Novel features of construction and arrangement of parts will appear from the following description.

In the accompanying drawings, which are merely intended to be illustrative of the principles of my invention but not to limit the scope of the latter to the construction shown, Figure 1 is a side elevation of a glass forming machine to which my invention is applied, the pressing or forming mechanism being omitted as forming no part of the present invention; Fig. 2 is a plan view of the same; Fig. 3 is a vertical section on enlarged scale of the pressing base or support for a mold during the forming operation, a mold being shown positioned thereon; Fig. 4 is a diagrammatic view showing the fluid pressure pipes and connections which I prefer to use in connection with my invention; Fig. 5 is an enlarged section along the line V—V in Fig. 6; Fig. 6 is a plan view showing the mechanism for intermittently rotating the mold support and for locking the same stationary between movements; Fig. 7 is a view on enlarged scale taken partially in section along the line VII—VII in Fig. 6, showing the mold support rotating and locking devices; Fig. 8 is a sectional view of the mold supporting rotating device taken along the line VIII—VIII in Fig. 6; Fig. 9 is a section of the table locking device taken along the line IX—IX in Fig. 6; Fig. 10 is a perspective of the cam for raising the mold rings; and Fig. 11 is a section along the line XI—XI in Fig. 2, showing the sand box and associated parts.

The following is a detailed description of the drawings.

A is a casting which forms the bed or base frame of the machine, and which is supported by a fixed axle 1 having wheels 2, and a pivoted axle $1^a$ having wheels $2^a$, the axle $1^a$ being provided with an upwardly extending cylindrical stud 3 at its center which engages a vertical socket 4 in the bed A. Thus the machine may be conveniently moved from place to place, as desired.

B and C represent a pair of vertical standards of cylindrical shape and supported by the bed A. Thus the standard B may be stepped in a socket 5 in the bed, while the lower end of the standard C may extend down through a cylindrical collar 6 in said bed and be held rigidly therein by any convenient means, such as the set screw 7.

8 is a sleeve slipped over the standard C and supported in position above the bed A, as by the split ring 9 seated in a circumferential groove in said standard C.

10 is an annular depending bracket rigidly mounted on said sleeve 8 and provided with an annular ball raceway 11 for the antifriction members 12 upon which bears the lower end of the hub 13 of the mold table D, said hub being journaled on said bracket 10, as shown.

The table D is preferably an integral casting composed of the hub 13 from which radiate arms 14 whose outer ends merge into tangential bars 15 connected together at their ends, and from each of which tangential bars extend outwardly a pair of parallel mold carrying arms 16. 17 represents horizontal stiffening webs which occupy the angles between the arms 16 of adjacent pairs, and 18 are similar webs which connect together the members of each pair of arms 16 adjacent to their inner ends.

Adjacent to their outer ends said pairs of arms 16 are provided on their top edges with alined journal sockets 19 in which are journaled the pivot studs 20 extending from the opposite sides of the molds E.

Each mold is provided with a toothed sector 21 rigidly mounted concentrically with one of the pivot pins, and said sectors are provided with enlargements 22 which normally rest upon the webs 18 and hold the molds upright against inwardly tipping toward the axis of the mold table. To prevent the molds tipping outwardly, except when their product is to be dumped, the pivot studs 20 are offset from the center line of the molds toward the outer ends of arms 16, thus counterbalancing the molds inwardly and causing them to be supported in an upright position by the contact of the enlargements 22 with the webs 18.

At the juncture of each of the radial arms 14 and the associated tangential bar 15 there is an enlargement 23 through which are provided the larger vertical bore 24 and the smaller vertical bore 25, said bores being alined with the axis of the table D and of the corresponding mold E, and the smaller bore being outside of the larger bore, as shown in Fig. 1. 26 is a cylindrical plunger sliding in the bore 24 and having at its lower end a roller 27 which is adapted to engage a cam track extending up from the table D. 28 is a smaller plunger sliding in the bore 25 and yoked to the upper end of plunger 26 by split clamp 29, thereby moving in unison with and preventing rotation of plunger 26 in the bore 24. 30 is a stem which is inserted in the bore of the plunger 26 and held at any desired elevation in the same by the clamp 29. The wall of the upper portion of said plunger 26 is split as at 31 to permit the clamping of the stem 30 rigidly in place. 32 is a horizontal arm fixed intermediate of its ends on the stem 30 and provided at its outer end with an eye or circular loop 33 in which is seated the mold top 34. The inner end of the arm 32 is provided with a counter weight 35. The mold top 34 is maintained in the same vertical plane as the mold E. 36 is the cam track carried by the base A and provided with an inclined forward portion, followed by a horizontal intermediate portion and ending in a relatively abrupt descent, as shown, the track being curved so as to be engaged by the rollers 27 as the table D revolves counter-clockwise, thus raising the mold tops out of engagement with their molds to enable the molds to be dumped for the discharge of the product, and then permitting the mold tops to descend down into place on the molds for the gathering, shearing and pressing operations.

I will now proceed to describe the mechanism shown provided for rotating the mold table intermittently and for locking the same stationary between said movements.

37 is a pressure cylinder horizontally mounted on the bed A and whose piston rod 38 is connected to a slide 39 which moves in a suitable slideway in said bed. 40 is a pin extending upwardly from said slide and having pivotally mounted thereon a block 41 which slides in a slot 42 undercut in the bottom face of the rocking bar 43. Said rocking bar is formed of two sections having at their adjacent ends semi-circular hub sections 44 which are attached together about the sleeve 8 by means of the bolts 45, whereby said rocking bar is pivotally mounted on the standard C. It is thus evident that said rocking bar will be swung counter-clockwise by the extension of the piston rod 38 and clockwise by the retraction of said piston rod.

The other end of the bar 43 is provided with a vertical cylindrical post 46 and a horizontal extension or bracket 47. The post 46 is vertically bored to receive a sliding bolt 48 which is provided at its lower end with a fixed radial pin 49 which protrudes through a vertical slot in the wall of the post. 50 is a helical spring whose lower end is connected to said pin and its upper end to a pin 51 extending from said post. The upper end of the bolt 48 is intended to seat in any one of an annular series of holes 52 on the under side of the table D, said holes being spaced apart a distance equal to the arc of movement through which said table is to be intermittently rotated. It is evident that the spring 50 will tend to seat the bolt in one of said holes and hold it therein, so that the counter-clockwise swing of the bar 43 will serve to carry the table around with it to the limit of its stroke. On the return movement of the bar 43, the bolt will trail back along the under surface of the table until at the completion of the back swing of the bar, said bolt will encounter and seat in the next hole 52, ready to again rotate the table on the next forward swing of the bar 43.

53 is a casting secured on the bed A and provided with a vertically disposed piston chamber 54, closed at the bottom and open at the top, in which is mounted a piston 55 whose upper end is beveled and adapted to protrude to engage one of an annular series of sockets 56 on the under side of table D spaced apart a distance equal to the movement of the table during its intermittent rotation. Said casting is also provided with a slide valve chamber 57 closed at top and bottom and of less height than the chamber 54. 58 is a valve sliding in chamber 57. 59 is a pin fixed radially in the piston 55 and extending through a vertical slot in the casting 53. 60 is a latch arm having its upper end pivotally secured to the outer end of pin 59 and its lower end provided with a notch 61 adapted to engage a pin 62 extending from the casting, whereby the piston may be held in a retracted position out of engagement with the table D. 63 is a helical spring having its lower end attached to the lower end of arm 60 while its upper end is attached to the exterior wall of the casting, thereby tending to draw and hold the notch 61 of the latch arm 60 in engagement with the pin 62. 64 is a lever pivoted intermediate of its ends to the brackets 47 of the bar 43 and having one end pivotally connected to the pin 49 on the lower end of the bolt 48. The free end of the lever 64 is notched, as shown, to engage a pin 65 on the lower end of the latch arm 60, whereby as the bar 43 completes its forward stroke the notched end of the lever 64 will engage the pin 65 and release the said latch arm from the pin 62, thus permitting the piston 55 to rise and go into locking engagement with the table D, thereby locking said table stationary. At the same time the upward movement of the latch arm 60 and its pin 65 will elevate the free end of the lever 64 and thus depress the bolt 48 out of engagement with the table, thereby permitting the bar 43 to rock rearwardly without moving the table with it, the bolt 48 trailing back along the under face of the table until, at the completion of the rearward movement of the bar 43, it encounters the next hole 52 of the table.

A vertical slot 66 connects the lower portions of the chambers 54 and 57 and provides clearance for a pin 67 radially fixed in the piston 55 and extending through said slot and having its outer end seated in a loosely fitting socket or hole in the slide valve 58, thereby flexibly coupling the piston and slide valve together.

The upper end of the valve chamber 57 is provided with a pressure inlet port 68, and 69 is a port in the bottom of said chamber. Below the level of said port 68, said chamber is provided with three vertically alined and equally spaced ports 70, 71 and 72. The slide valve 58 is provided with a vertical passage 73 extending down from its top and connected to a diametrical port 74 which, when the slide valve is raised, registers with the port 72 of the chamber. When the slide valve is depressed, the port 70 is in communication with the pressure port 68. The slide valve is also provided with a reduced or bleeder passage 75 extending down from the passage 73 to the bottom of the slide valve. Said slide valve is also provided with a recess 76 which, when the valve is depressed, connects the ports 71 and 72 of the chamber and, when said valve is raised, connects the ports 71 and 70 of said chamber.

A constant fluid presure pipe 77 connects with the port 68 and a pipe 78 connects the port 69 with a pressure relief valve 79, placed convenient to the punty of the operator when he is placing a gather of glass in a mold. Thus the operator may relieve the pressure against the under side of the valve 58, thereby permitting the pressure against the top of said valve to force said valve and the piston 55 coupled thereto downwardly, thus unlocking the table D.

A pipe 80 connects the port 70 of the valve chamber with the rear end of the cylinder 37, while a pipe 81 leads from the port 72 to the front end of said cylinder 37. A branch pipe 80ª connects the pipe 80 with the rear end of the cylinder 82 which operates the shears 83, while a branch pipe 81ª connects the pipe 81 with the front end of said shears cylinder. The port 71 is open to atmosphere for the relief of pressure.

Thus, when the slide valve 58 is elevated and the piston 55 is in locking engagement with the table D, pressure is admitted through the passage 73, ports 74 and 72, and pipe 81 to the forward end of the cylinder 37 thus retracting the piston rod 38 and swinging the bar 43 clockwise, while the table remains stationary. At the same time pressure is admitted through the pipe 81ª to the front end of the shear cylinder 82, thus causing the shears 83 to open. Simultaneously the pressure is relieved from the opposite ends of said cylinders through the pipe 80, the port 70, the recess 76 and the relief port 71. As has been explained, the elevation of the piston 55 results in the temporary retraction of the bolt 48 from engagement with the hole 52 which it has engaged during the forward swing of the bar 43 to rotate the table. Thus as the bar 43 swings rearwardly the table remains stationary while bolt 48 trails rearwardly along the under surface of the table until it engages the next hole 52.

When the operator opens the relief valve 79, the pressure is quickly relieved in the lower end of the chamber 57 because it permits the air to escape faster than the bleeder passage 75 can supply it, enabling the pressure in the upper portions of said chamber to depress the slide valve 58, carrying with it the piston 55, and thus unlocking the table. Said piston is then held in its retracted position by the engagement of the notch 61 of the latch arm 60 with the pin 62, as shown in Fig. 7. When the valve 58 is depressed, the ports 71 and 72 are connected by the recess 76 and the port 70 is in communication with the pressure port 68. Thus pressure is admitted by the pipe 80 to the rear ends of the cylinders 37 and 82, and pressure is exhausted through the pipe 81, port 72, recess 76 and port 71, from the front ends of said cylinders. Thus the shears close and sever the neck of glass from the gather which the operator has placed in the mold, and the bar 43 is swung forwardly, counter-clockwise, thus rotating the table until once more the lever 64 throws loose the latch arm 60 and permits the piston 55 to rise into locking engagement with the next socket 56 of the table. The bleeder passage 75 permits a gradual equalizing of pressure at both ends of the slide valve and enables the pressure to accumulate under the piston 55 to elevate the piston 55 into locking position. This elevation is somewhat assisted by the spring 63. 55$^a$ represents circumferential oil grooves on said piston to retard the escape of pressure up along the same from the bottom of chamber 54.

The relief valve 79 is so located that when the operator places a gather of glass in one of the molds, his descending punty strikes and actuates said valve. The relief capacity of the valve 79 is greater than the supply capacity of the bleeder passage 75, so that pressure is exhausted from beneath the piston 55 and valve 58 at a faster rate than it is supplied through the bleeder passage 75.

F is a bracket, having a split collar 84 which is bolted around the lower end of the standard C below the bed A, extending out in front of the truck and provided with an integral horizontal circular plate 85 on which is secured an annular plate or sleeve 86. 87 is an annular sand box resting upon the plate 85 and axially journaled on the sleeve 86. Said box is partially filled with sand or other cushioning material, as shown, to receive the finished product dumped from the molds.

The under face of said box is provided with an annular concentric toothed rack 88 which is engaged by a pawl 89 mounted on the outer end of a swinging arm 90 whose inner end is pivoted to the bracket F. A rod 91 connects said arm 90 with the bar 43, so that they swing in unison. When the bar 43 moves forwardly and rotates the table D, the pawl 89 engages the rack 88 and turns the sand box 85 while a reverse movement of the bar 43 causes the pawl to trail back over the teeth of the rack without rotating the sand box in a reverse direction. 92 is a loop whose ends are attached to the bracket F and which passes underneath the arm 90 to hold the pawl in proper horizontal position.

G is a pedestal extending upwardly from the plate 85 and provided with a vertical groove 93 in which slides the upper squared end of the piston rod 94 of a fluid pressure cylinder 95 depending from the bracket F. The upper end of said piston rod is provided with a wrist pin 96 which engages a slot 97 in the radial leg 98 of the toothed sector H whose center is pivoted by the bolt 99 to the bracket 100 of the pedestal G. 101 is a bar secured at its ends to the bracket 100 and spaced away therefrom to enable the sector to swing in proper alinement between said bar and the bracket.

The sector H is so positioned and alined that it will engage and mesh with the sector 21 of the mold E whose mold top 34 has been elevated out of the way, as shown in Fig. 1.

Referring now to Figs. 4 and 5, 102 is an open ended cylindrical valve casing secured to the under side of the bed A beneath the path of the slide 39. Said casing is provided with a central port 103 in its wall connected by a pipe 104 with the pressure pipe 77. Said casing is also provided with three ports 105, 106 and 107, equally distant apart and alined longitudinally of said casing. The port 105 is connected by a pipe 105$^a$ to the bottom of the cylinder 95, while the port 107 is connected by a pipe 107$^a$ with the top of the cylinder 95. The central port 106 is an exhaust port to atmosphere. 108 is a valve plug sliding in the casing 102 and provided with a recess 109 which is always in communication with the pressure port 103. Said plug is also provided with a pair of ports 110 and 111, leading from said recess diametrically through said plug. The plug is also provided with a recess 112 which connects the exhaust port 106 with either the port 105 or 107 according to the position of the valve plug 108. The ports are so positioned that when the port 107 is connected by the recess 112 with exhaust port 106, the port 110 connects the port 105 with the recess 109 and the pressure inlet port 103, and vice versa, when the recess 112 connects the port 105 with the exhaust port 106, the port 111 connects the port 107 with the recess 109 and the pressure port 103.

Thus, when the valve plug is in the position shown in Fig. 5, pressure will be admitted to the upper end of the cylinder 95 and exhausted from the lower end of the same, thereby rotating the sector H downwardly and, as a mold sector 21 would then be in mesh with sector H, upsetting the mold and discharging its contents into the sand box 87. When the valve plug is moved toward the right in Fig. 5 to register the ports 110 and 105, pressure is admitted to the lower end of said cylinder and exhausted from the upper end of the same, thus rotating the sector H upwardly and restoring the mold to its upright, normal position.

The valve plug 108 is moved in the casing 102 by means of studs 113 extending upwardly through slots in the bed A into the path of the slide 39. Thus as the slide 39 reaches the termination of its outward movement, which swings the bar 43 counter-clockwise and rotates the mold table, the plug 108 is moved into the position shown in Fig. 5, thus admitting pressure into the upper end of the cylinder 95 and exhausting the pressure from the lower end of the same, thus rotating the sector H downwardly which causes the mold, whose sector 21 has just come into mesh with the sector H, and whose mold top has just been elevated, to be inverted or upset for the discharge of its contents. When the block 39 reaches the termination of its next, or rearward, movement, it moves the plug 108 toward the right in Fig. 5, thus causing the passage 110 to register with the port 105, admitting pressure to the lower end of the cylinder 95 and exhausting the pressure in the upper end of the same. This causes the sector H to rotate upwardly, righting the mold whose sector 21 is in mesh with said sector H. This righting operation is accomplished before the table is again rotated, so that upon the next movement of the table, the mold is in proper position to receive the gather of glass from the operator's punty.

I do not show the pressing mechanism, as the same is no part of my present invention, but it will be understood that any pressing or forming means which descends into the mold may be used. Such means may be supported by the standards B and C.

I provide a pressing base I upon which the molds rest in turn during the pressing operation, thus preventing the pressure exerted by the pressing plunger from straining and tilting the mold table D, and holding the mold in proper position to receive the plunger. Said base is of the following construction, as shown in Fig. 3.

113 is a circular casting or block vertically mounted on the bed A, beneath the pressing plunger, not shown. 114 is a cylindrical sleeve vertically sliding on said casting. 115 is a circular plate mounted on top of said casting, and when said sleeve is depressed, its upper beveled edge is flush with the top surface of said plate. Said casting is provided with an upwardly extending axial bore 116 whose lower end is enlarged to form the piston chamber 117. 118 is a plunger moving in said bore and provided on its lower end with a piston 119. 120 is a horizontal pin fixed in the upper end of said plunger, extending through a diametric slot 121 in the casting, and having its outer ends fixed in holes in the sleeve. 122 is a passage in the casting 113 connected to a pipe 123 and leading into the bottom of the piston chamber 117. The pipe 123 connects with the pipe 81. 124 is a passage in the casting 113 connected to a pipe 125 and leading into the top of the piston chamber. The pipe 125 connects with the pipe 80.

The sleeve 114 is of proper internal diameter to slip up over the bottom end of the molds E and the top surface of the plate 115 is somewhat higher than the bottoms of the molds E when they are suspended normally on the mold table D. Thus when a mold is swung around into the pressing position, it rides up over the beveled edge of the depressed sleeve 114 and centers itself on the plate 115, being slightly elevated and thus raising its weight from the arms 17 of the mold table. As explained, simultaneously with the rise of the locking piston 55 to lock the table D stationary, pressure is admitted to the pipe 81 and consequently also to the pipe 123, and the pressure in the pipe 80, and consequently also in the pipe 125, is exhausted, thus elevating the piston 119 and with it the sleeve 114 which then encircles the lower end of the mold, as shown in Fig. 3, and holds it rigidly in proper position for the pressing operation. Further, when the locking piston 55 descends to release the table preparatory to another rotation of the latter, the pipe 81 is relieved of the pressure and the pressure is admitted to the pipe 80, thus depressing the piston 119 and with it the sleeve 114, thus releasing the latter from the mold so that it may move unobstructedly with the table.

It is apparent from the foregoing description that the molds are in turn presented to the pressing or forming position and during such operation all strain is relieved from the mold support or table and its associated mechanism. When the article is completed in the mold the mold in turn reaches the discharging position, its ring is raised out of the way, the mold is reversed and its contents dumped and carried out of the way, and the mold is returned to its normal position. As the mold passes on to receive a new supply of glass for the next forming operation, its ring is depressed into position on top of the mold.

Although, for the sake of clearness, I have minutely described the embodiment of my invention shown in the drawings, I do not wish to limit myself thereby, but claim broadly:—

1. In a machine of the character described, a mold support, fluid pressure actuated means for rotating said support intermittently, a piston chamber, a locking piston working in said chamber and adapted to engage said support to hold the same stationary, a valve chamber separate from said piston chamber, a slide valve in said valve chamber coupled with said piston, and fluid connections for said valve chamber, whereby when said rotating means are operative said piston is retracted out of engagement with said support.

2. In a machine of the character described, an intermittently revolving support, molds pivotally mounted on said support, an oscillatory member moving in a plane normal to said support and adapted to engage said molds and upturn the same for the discharge of their contents and means for actuating said member when the support is stationary.

3. In a machine of the character described, an intermittently revolving support, molds pivotally mounted on said support, an oscillatory member moving in a plane normal to said support and adapted to engage said molds and first upturn the same to discharge their contents and then return the same to their normal position, and means for actuating said member when the support is stationary.

4. In a machine of the character described, a mold table, means for rotating said table intermittently, a series of molds swingingly supported on said table, sectors carried by said molds, a power-actuated sector mounted adjacent to said table and adapted to engage said mold sectors in turn, and means whereby said second-named sector is actuated when said table is stationary.

5. In a machine of the character described, a mold table, means for rotating said table intermittently, a series of molds pivotally mounted on said table, sectors carried by said molds, a sector mounted adjacent to said table and adapted to engage said mold sectors in turn, and means whereby said last named sector is oscillated in the direction to upturn said molds and then in the direction to right the same when said table is stationary.

6. In a machine of the character described, an intermittently revolving support, an annular series of molds pivotally mounted on and concentric with said support, an annular receiving receptacle mounted adjacent to said support, means for revolving said receptacle in unison with said support, and a member actuated while said support and receptacle are stationary adapted to engage said molds in turn and upset the same to dump their contents into said receptacle.

7. In a machine of the character described, a rotary mold support, molds pivotally mounted on said support, movable tops for said molds, means adjacent to said support adapted to engage said molds and dump their product, and means for lifting the mold tops out of the way during the dumping operation.

8. In a machine of the character described, a rotary mold support, molds pivotally mounted on said support, a movable top ring for each mold mounted on said rotary mold support, means adjacent to said support for dumping the product from said molds, and means for elevating the mold top from the mold during the dumping operation.

9. In a machine of the character described, a rotary mold support, provided with pairs of radial arms provided with journal bearings, molds provided with lateral pivot studs engaging said bearings by means of which said molds are swung between said arms, said studs being outwardly off center of said molds whereby said molds tend to upset inwardly toward the axis of said support, and means for preventing the inwardly upsetting of said molds, for the purpose described.

10. In a machine of the character described, a rotary mold support, provided with pairs of radial arms provided with journal bearings, molds provided with lateral pivot studs engaging said bearings by means of which said molds are swung between said arms, said studs being outwardly off center of said molds whereby said molds tend to upset inwardly toward the axis of said support, and a member carried by each of said molds and adapted to engage said support and prevent the inwardly upsetting of said molds, for the purpose described.

11. In a machine of the character described, a rotary mold support, molds pivotally mounted on said support, a fluid pressure cylinder, a piston and piston rod working in said cylinder, means whereby when said piston rod is extended said mold support is rotated, molds pivotally mounted on said mold support, means adjacent to said mold support adapted to engage said molds and dump their product, a second fluid pressure cylinder operating said dumping means, a valve controlling the admission of fluid pressure to said second cylinder, and means whereby when said piston rod completes its extension stroke said valve is moved to admit fluid to said second cylinder to upset said molds and when said piston rod completes its retraction stroke said valve is moved to admit fluid to said second cylinder to right said molds.

12. In a machine of the character described, a mold support, molds pivotally mounted on said support, means for rotating said support intermittently, means located adjacent to said support and adapted to upset said molds to discharge their contents and then right the same, a fluid pressure cylinder operating said upsetting means, and a valve operated by the means for rotating said support controlling the admission of fluid to said cylinder.

13. In a machine of the character described, the combination of forming means, a mold support, a series of molds mounted on said support, the mounting of such molds being such as to permit their vertical movement independently of said mold support; means for moving said support intermittently to bring said molds in turn into position under said forming means, and an elevated mold supporting base beneath said forming means upon which the said molds mount as they approach the forming position whereby the weight of the mold is lifted from the mold support and said mold support is relieved of strain during the forming operation.

14. In a machine of the character described, the combination of forming means;

a mold table; a series of molds mounted on said table, the mounting of such molds being such as to permit of their vertical movement independently of said table; means for moving said table intermittently to bring said molds in turn into position under said forming means, and an elevated mold supporting base beneath said forming means upon which said molds are in turn positioned during the forming operation, said molds being thereby elevated in relation to said table and the said table being thus relieved of strain during the forming operation.

15. In a machine of the character described, a mold support, molds mounted on said support, means for intermittently moving said support to bring said molds in turn into the forming position, a fixed base upon which the mold rests during the forming operation, and means associated with said base for holding said mold in position.

16. In a machine of the character described, a mold support, molds mounted on said support, means for moving said support intermittently to bring said molds in turn into the forming position, a fixed base upon which the mold rests during the forming operation, and extensible means for holding the mold alined on said base.

Signed at Pittsburgh, Pa., this 18th day of June, 1918.

WILLIAM J. MILLER.